United States Patent [19]

Jackson

[11] Patent Number: 5,042,220

[45] Date of Patent: Aug. 27, 1991

[54] FASTENER AND STRIP MOUNTING SYSTEM

[75] Inventor: Peter Jackson, Oswestry, United Kingdom

[73] Assignee: Richard Burbidge Limited, Oswestry, England

[21] Appl. No.: 355,745

[22] Filed: May 22, 1989

[51] Int. Cl.$^5$ .......................... E04C 2/38; F16B 19/00
[52] U.S. Cl. .................... 52/717.1; 52/714; 411/508; 411/913
[58] Field of Search ............... 411/84, 85, 508, 509, 411/182, 913; 24/297; 40/155; 52/242, 287, 288, 290, 714, 717.1

[56] References Cited

U.S. PATENT DOCUMENTS

| | | | |
|---|---|---|---|
| 1,936,113 | 11/1933 | Jelliffe | 411/182 |
| 3,228,160 | 1/1966 | O'Brien | 52/290 |
| 3,298,147 | 1/1967 | Haberman | 52/714 |
| 3,701,373 | 10/1972 | Wronke et al. | 411/182 |
| 3,703,747 | 11/1972 | Hamman | 52/717.1 |
| 3,841,044 | 10/1974 | Brown et al. | 24/297 |
| 4,428,135 | 1/1984 | Sobel | 40/155 |
| 4,452,021 | 6/1984 | Anderson | 52/717.1 |
| 4,579,492 | 4/1986 | Kazino et al. | 411/182 |
| 4,697,774 | 10/1987 | Sarton et al. | 24/297 |
| 4,742,662 | 5/1988 | Smith | 52/717.1 |

FOREIGN PATENT DOCUMENTS

| | | | |
|---|---|---|---|
| 2012338 | 10/1971 | Fed. Rep. of Germany | 52/290 |
| 707819 | 4/1954 | United Kingdom | 411/182 |

*Primary Examiner*—Neill R. Wilson
*Attorney, Agent, or Firm*—Brooks, Haidt, Haffner & Delahunty

[57] ABSTRACT

A wooden architectural moulding includes fasteners spaced from each other and each include a continuous mounting groove of re-entrant profile having inwardly facing internal ledges, and a unitary fastener provided with deformable limbs having profiled noses which are arranged to interact with the ledges to connect or disconnect the base member.

8 Claims, 5 Drawing Sheets

FASTENER AND STRIP MOUNTING SYSTEM

BACKGROUND OF THE INVENTION

1. Field of the Invention

This invention relates to fasteners and mountings and is particularly, but not exclusively, concerned with the fastening and mounting of decorative wooden strip mouldings.

2. Description of the Prior Art

The term mounting is used herein to embrace disparate fasteners, fixtures and fittings for attaching one element—of whatever shape—to another, however achieved.

In the fastener art an enormous variety of disparate devices, mechanisms and arrangements are known, ranging from, say, automobile internal or external trim snap-action clip fittings, through building structural supports, such as expanding wall plugs, to cabinet making and joinery blind-joints.

It is generally desirable to provide a secure, often selectively-releasable or detachable, attachment mechanism, which will be reasonably simple in overall design and thus economical to manufacture.

In the particular circumstance of so-called 'blind-fixing'—that is a fixture or fitting which is not visible from a 'front' orientation of an element held by the fixture, it is generally desirable to avoid penetrating the thickness or depth of that element by a fixture passing from one (front) surface to an opposite (rear) surface. To do otherwise requires some form of precision fabricated filler or blanking piece and a precision aperture in the element itself.

In the finishing art in the building, construction, decoration, refurbishment or architectural trades, it has long been known to use pre-fabricated finishing strip material, whether of wood, plaster or otherwise, in order to enhance the finished appearance after basic construction is completed. Often, advantage is taken of the presence of such a finishing strip—for want of a better expression—to cover or disguise an unwanted or otherwise visually intrusive feature, and indeed to shield or protect a conduit, trunking or tube, providing, say, electrical, water, drainage or heating services.

Although such finishing materials may represent a more costeffective means of achieving a desired overall standard of general finish than would be feasible with what might be termed 'craftsman standards' of 'on-site' hand finishing of individual component elements, for example along abutting join of two panels, or at a corner site, or junction between walls and ceiling or floor, where misalignment between intersecting and supposedly planar and rectilinear surfaces becomes most apparent, they nevertheless are expensive in themselves—not least because of the intricacies in surface profile and high standards of surface finish inherent in their construction.

Moreover, it does not necessarily follow that such finishing strips will entirely 'de-skill' the fitment or installation of the strips themselves. In particular, if, as is commonly the case, no special provision is made in the design of the strip mouldings for their installation, for example, mounting upon a surface, it may be necessary to resort to relatively crude fastening techniques; even for example, piercing the critical surface finish to penetrate the body of the strip with a screw or the like and afterwards in-filling with proprietary filler or blanking dowels.

This essentially means interfering with and thus usually spoiling the finish surface so carefully produced, simply in order to install the surface in the desired location and thereafter, seeking to rectify the damage done with techniques which cannot match the standards of finish of the original strip, which is generally fabricated off-site on special-purpose machines.

If special fasteners or mountings are provided, for example clips and the like, they have often still been visible when the strip is mounted, for example, by embracing the overall strip cross-section, or are otherwise noticeable, for example by keeping the strip marginally away from the mounting surface, by virtue of the fastener depth itself.

Further the fasteners may not allow ready removal of the strip once fitted—should this be desired.

An elaborate fastener is expensive to manufacture and thus, if a large number of such fasteners is required, so the expense is multiplied, to the extent that the user may be encouraged to revert to ordinary fasteners driven through the body of the strip as previously discussed.

Thus the fastener spacing is a crucial factor in determining the number of fasteners required for a given length of strip and this is in turn reflected in the security of grip or hold afforded by an individual fastening. Too secure a hold will result in the strip being difficult to remove, for example by simply prising apart from the mounting surface, without causing surface damaging, i.e., marring the very improved appearance which the fastener is intended to impart.

On the other hand, too loose a fastening could allow the strip to become inadvertently dislodged, for example by casual contact.

Of course, non-removability may be accepted as a limitation, but particularly for (hard)wood finishing strips, removal could facilitate separate decoration of surrounding and indeed abutting areas, for example painting or papering the mounting surface itself.

Indeed, in the very original fitting operation, temporary positioning and subsequent repositioning may be required, for which purpose a disconnectable fastening or fitting is clearly advantageous.

It is also desirable that the fitting and fastening arrangement facilitates the marking out and aligning operation for determining the strip position. That is if the strip can be offered up to the mounting surface, preliminary temporary markings made, and the fasteners positioned from those markings, whereafter the strip will automatically be aligned without distortion—for example because the fastenings have been mounted in a curve rather than a straight line.

It is advantageous if the fastener is a one-piece element, with no separate complementary part required on the strip itself, and if it can be fabricated of synthetic plastics material, so that when the initial tooling cost is recovered, the marginal cost of producing subsequent fasteners is substantially reduced.

The overall requirement for a low-cost, simple, secure, reusable, fastening is not easily met in practice.

The term 'strip' used herein, embraces any shape of article to be mounted, but is especially concerned with elongate objects—that is whose cross-section is small in relation to their length, and more particularly, where the cross-section is uniform over the length.

The fastener should lend itself to the alignment of multiple abutting strips.

Symmetry of the fastener means that the mounting orientation is reversible, ie. the fastener cannot effectively be mounted upside down, so that the fasteners may be positioned more readily.

For convenience, the fasteners should be mountable at any position along a strip.

No special outer profile of the strip, which would change the appearance of the front of the strip locally, should be required for the fastener location.

No special mounting or tightening steps or tools should be necessary.

The strip should lie with its rear face flush with the mounting surface.

Any re-shaping of the strip should be uniform along its length and otherwise not unduly complex to produce.

To an extent the fastener could be self-locking—that is to say, at least initial attempts at withdrawal or removal of the strip would be resisted in a manner reinforcing the interengagement of the fastener and the strip, but possibly (although not essentially) allowing disengagement upon further applied force.

The fastener should accommodate some deformation or misalignment of the strip, but should otherwise promote retention of alignment of the strip.

The fastening action should be achieved by a straightforward relative movement of the strip and fastener—preferably a linear translational movement, rather than a rotational or twisting action.

SUMMARY OF THE INVENTION

According to one aspect of the invention, there is provided a fastener (10), comprising
a base portion (11),
a plurality of resiliently deformable limbs (12) upstanding from the base portion,
the outer ends or noses (14) of the limbs being spaced to engage the inner-facing walls (26) of a mounting recess (30) in an element (18) to be fastened thereby.

The noses also incorporate bevelled contact surfaces (16) so that engagement with recess walls (26) laterally deflects the limbs to allow passage of the limbs as a whole deeper into the recess and thus closer coupling movement of the fastener and element to be mounted.

Further relative movement of the fastener and element allows the noses to transfer to a laterally wider innermost region of the recess, whereby the limbs can relax into their undeflected conditions, but with the undersides of the noses resting in contact with abutment ledges (24) forming a mouth in the recess inner walls, inhibiting withdrawal of the fastener from the recess.

According to another aspect of the invention, there is provided a fastener for a (strip) element,
comprising a base portion for securing to a mounting surface,
a plurality of opposed pairs of protruding limbs extending from the base portion,
limbs being selectively engageable with an element, such as an elongate decorative finishing or trim strip, to be fastened thereby.

The noses of the limbs define an engagement and capture area for the fastener action,
the limbs being resiliently deformable and
movable between an uncoupled and coupled condition.

The limbs are resiliently biassed towards the coupled condition, whereby relative translational movement of an element and the fastener, with the respective capture zones or regions thereof in alignment, effects the fastening action by moving the limbs through an uncoupled condition to a coupled condition.

Preferably, the fastener is fabricated of synthetic plastics material, such as ABS, for example by moulding.

Desirably, the element itself has a capture zone profiled to receive and locate a fastener, or indeed a succession of such fasteners.

Conveniently, the cross-sectional profile of the element capture zone is re-entrant.

In one arrangement, the fastener limbs have tapered noses, with underlying opposed ledges, for respectively entering the re-entrant element capture zone and resisting withdrawal by restraining abutment with the boundary mouth of the zone.

A plurality of fastener limbs may be located, aligned in a row or rows of opposed pairs, running along the intended section length.

The fastener base may incorporate an aperture to receive another conventional fastener, such as a nail or screw, for securing the fastener body to a mounting surface.

Desirably, the element capture zone comprises a continuous recess of re-entrant profile, for example, a U-shaped cross-section, with tucked-in or re-entrant under-limbs at the mouth thereof, and a supplementary entry recess to receive the body of the fastener base.

Such an arrangement simply requires an orthogonal translational movement of the element, that is transversely to its own length and across its section depth.

According to a further aspect of the invention, there is provided a strip mounting system comprising fasteners and strip of the kind outlined in the immediately preceding paragraphs in co-operative array.

According to yet another aspect of the invention, there is provided a strip jointing system, comprising rectangular corner blocks, with whose side faces the ends of sections, severed at right angles to the section length, can simply be butted, without the need for elaborate corner mitring.

According to a still further aspect of the invention, there is provided a strip mounting and jointing system utilising fasteners of the kind previously outlined in connection with the present invention in co-operation with a pre-mitred corner jointing system—that is with predetermined lengths of strip section fabricated with complementary pairs of mitres, one at the abutting end of each pair.

According to yet a further aspect of the invention, section lengths with pre-profiled ends corresponding to the section face profile are provided to facilitate butt-jointing of sections.

BRIEF DESCRIPTION OF THE DRAWINGS

There now follows a description of some particular embodiments of the invention with reference to the accompanying diagrammatic and schematic drawings, in which.

DESCRIPTION OF THE PREFERRED EMBODIMENTS

Figure 4:
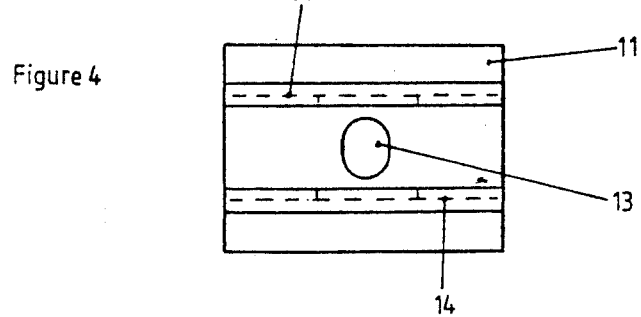
FIG. 4 shows an upper plan view, taken along the line 4—4' of the fastener shown in FIG. 1.
Figure 5A:
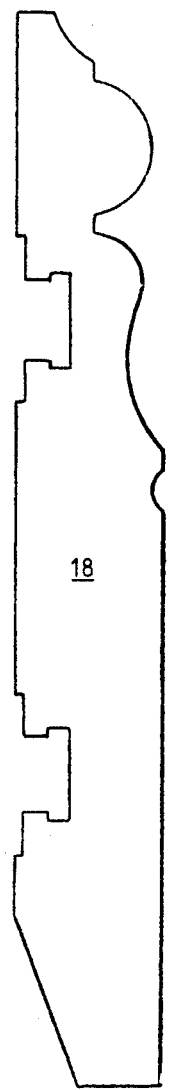
FIGS. 5A-5D show various other types of strip element and associated fittings, corner joints, some with pre-mitered and others with pre-scribed end face profiles.
Figure 5B:
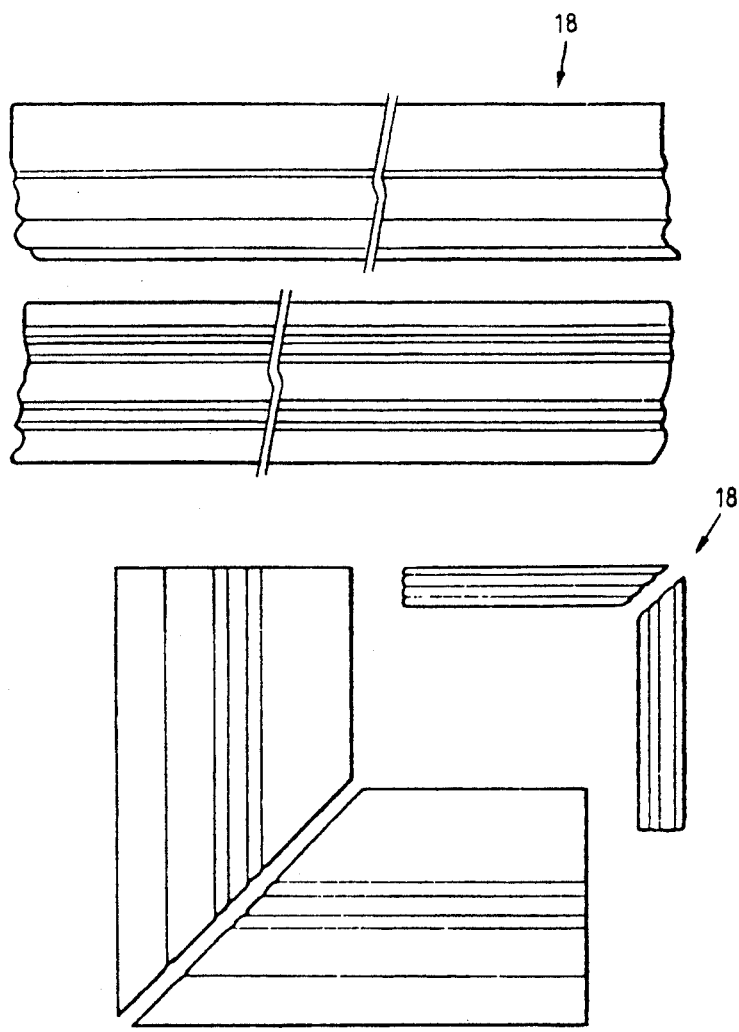
Figure 5C:
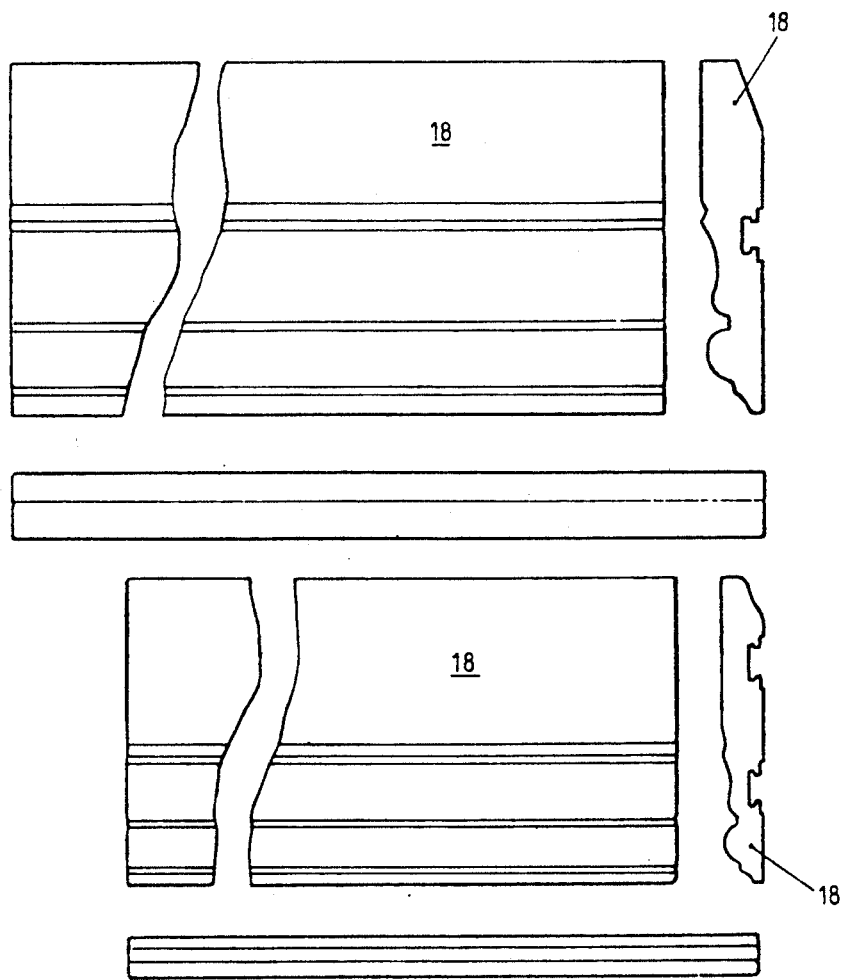
Figure 5D:
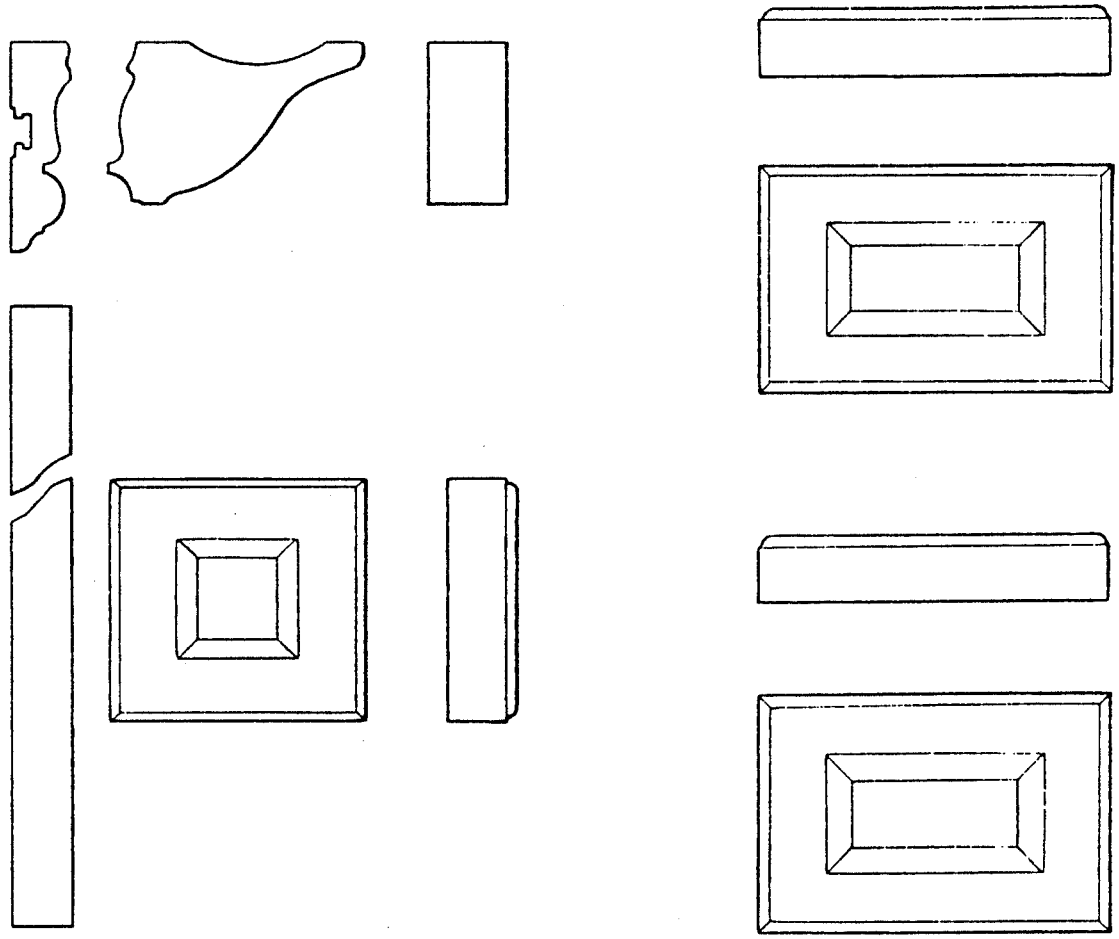

Referring to the drawings, a fastener 10 comprises a base portion 11 with two opposed pairs of protruding limb portions 12, whose disposition can be appreciated more clearly from FIG. 4.

Each limb 12 has a straight or upright inner face 15, and a tapered outer end nose 14, with a bevelled or sloping outer face 16.

Figure 2:
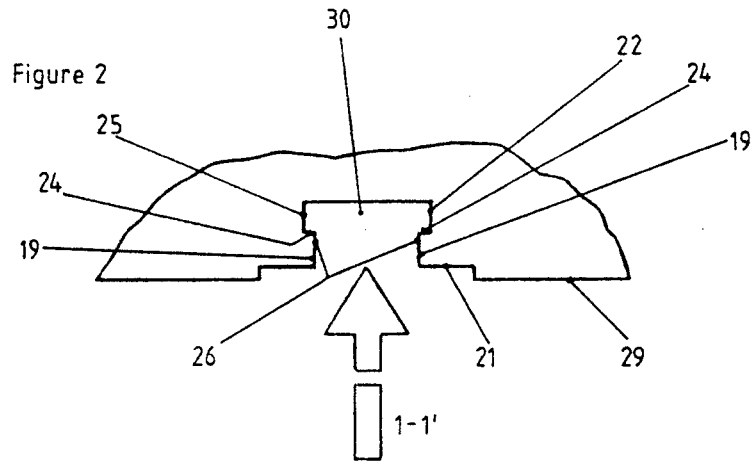
FIG. 2 shows a scrap section of an element, such as a cross section, to be secured by the fastener of FIG. 1.
Figure 1:
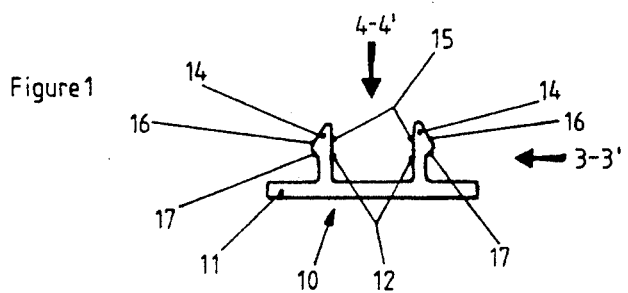
FIG. 1 shows an end elevation of a fastener element.
Figure 3:
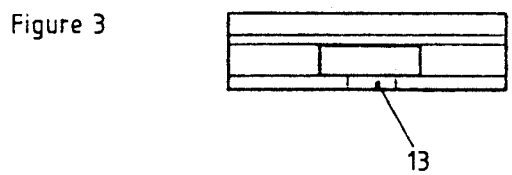
FIG. 3 shows an end elevation of the fastener shown in FIG. 1, taken generally along the line 3—3', but with some sectional detail.

An effective 'capture region' for the fastener is defined by the lateral spacing or 'embrace' of the tapered noses 14, which are designed to locate the side walls 26 of opposed mouth projections 19 of a recess 30 in the rear face of a strip element 18, shown partially in FIG. 2.

The fastener 10 is moulded of resiliently deformable synthetic plastics material.

Thus the otherwise upstanding limbs 12 are laterally or transversely deformable.

In fact, the limbs 12 can move between a 'relaxed' or 'coupled' condition—that is when they are received within the recess 30 in the body of the element 18—and a deformed or prised-together uncoupled condition when they, or rather their outer bevelled faces 16, engage the inwardly-directed faces 26 at the mouth of the recess 30.

Thereafter, with further penetrating insertion towards the floor of the recess 30, the limbs 12 are disengaged from the restraining side walls 26 and relax into the full width of the innermost cavity region of the recess 30.

In the latter condition, the undersides 17 of the noses 14 abut the upper faces 24 of the projections 19.

This restrains straightforward removal of the fastener, but it can still be prised away by wriggling or otherwise maneuvering the strip 18 relative to the fastener 10 body in order to flex and inwardly deflect or distort the limbs 12 and thereby to disengage the noses 14 from the recess 30.

An aperture 13 is provided in the base plate 11 of the fastener 10 to facilitate attachment to a mounting surface, for example by a simple screw or nail fitting.

In practice, the fasteners 10 would be spaced at regular, say 18 inch, intervals along the length of the strip element 18. Alignment can be achieved simply by ruling a line representing the desired mounting axis on a mounting surface and aligning the apertures 13 in successive fasteners 10 with that line.

With a single aperture 13, the fastener 10 as a whole may be twisted slightly into axial alignment with the longitudinal axis of the mounting recess 30 in the strip element 18.

The recess 30 incorporates a shoulder entry region 21, to accommodate the depth of the fastener base 11, so that the strip element 18 may be mounted with its rear face 29 in flush abutment with the mounting surface.

The fastening direction—that is the direction of relative linear translational movement of the fastener 10 and strip element 18—is indicated generally by arrow 1—1' in FIG. 2.

It should be appreciated that, in principle, an element of any shape may be fastener-mounted with such an arrangement and indeed the recess 30 may be of limited extent, that is localised or in a series of locations. However, the arrangement is particularly advantageous with a uniform section strip element, or at least a strip element with a uniform section recess on the rear face thereof.

Although applicable to a variety of material types, the invention is particularly concerned with the mounting of decorative finishing (hard)wood mouldings, commonly known as architectural mouldings.

The recess 30 may accommodate additional elements other than fasteners, for example, it may serve as a cable conduit or even small-bore water heating pipe conduit provided it does not undermine or otherwise interfere with the principal fastener action.

The remaining Figures show various forms of strip element, some of greater width and depth and with multiple (parallel) grooves or elongate recesses on their rear faces.

The rear strip faces may incorporate a bevel at the underside to accommodate mounting surface irregularities, particularly when the strip is located at the intersection of two mounting surfaces—for example, between a wall and a floor, with a skirting moulding.

The various other components of the strip and strip mounting system, for example, corner jointing blocks and pre-mitered corner pairs of section strips, may also incorporate grooves on the rear faces to receive the fasteners.

Such components ease the fitting and enhance the 'DIY' appeal of the system.

Thus, pre-scribed strip element lengths may be provided, with one end profiled as a complementary shape to the section face, so that two such elements may be brought together into intimate and close-fitting contact, at say an internal or external corner, without elaborate further cutting, fitting—and waste if incorrect cuts are made.

This can be an alternative to, or may be used in conjunction with, the simple rectangular cut butt joint of the corner (fillet) block arrangement.

The corner joint pre-profiling may be adapted to either internal or external corners.

Similarly, the individual section profiles may be adapted to allow co-operative interfitting or jointing of different strip profiles, for example, a smaller strip butted against the flat front face portion of a larger strip.

Alternatively, the edges of the strips may be profiled to allow two strips to be brought together, for example at a corner location, along their abutting or overlying longitudinal edges.

Larger and more complex section profiles, depths and heights may be built up in this way.

The position of the mounting groove on the rear section face is determined in relation to the overall section depth—i.e. without weakening the section unduly.

With precision machined (hard)wood mouldings, it is important to design a section that can readily, economically and consistently be machined, without encouraging warping or distortion or even mechanical failure under stress, for example, when being handled and fitted.

Temperature and humidity changes have a bearing on this, from the initial choice and machining of raw material stocks, to the shipment and end-user environments.

In use, a line, usually (but not necessarily as discussed below) horizontal or vertical, is marked on the mounting surface, at a position corresponding to the desired strip center line or fastener aperture center line if the fastener is not symmetrically-disposed across the section width.

This line can be determined by offering the strip itself up to the mounting surface and marking along an edge thereof and subsequently measuring from that edge line as a reference for the fastener axis.

Holes are then drilled at prescribed intervals, for example approximately 400 mm, plugged and the fasteners secured, for example by screws, and aligned.

The strip can then simply be offered up in alignment with the fasteners and pressed home against the mounting surface, to effect the snap-action engagement of the fastener limbs with the recess(es) in the rear face thereof.

When jointing continuous aligned lengths, a fastener is desirably positioned at, and bridges the joint, to ensure alignment of the butt joint.

Instead of a continuous or segmented groove aligned with the strip axis, alternative recess orientations and configurations may be employed.

For example, the recess axis may be inclined at a predetermined angle to the strip axis, so that the element is mounted at a desired angle.

In this way, desired configurations or 'patterns' of strips on the mounting surface may readily be installed.

The spaced fasteners can accommodate lack of regularity, unevenness or misalignment of the mounting surfaces; for example walls are not always truly square with themselves or floors and ceilings; and similarly nor are window and door frames necessarily square in themselves or with adjacent edges and surfaces.

The pre-fabricated corner joints can help disguise such construction defects.

The strips themselves will accommodate a limited amount of flexing over such irregularities or discontinuities.

Nevertheless, local removal of limited amounts of the strip material, preferably from the rear face or lower edge, can still be effected during fitting, without disrupting the fastening action.

Similarly, proprietary fillers may be used to rectify minor defects and even supplementary trim moulding lengths as a continuous fillet along the strip edges.

For ease of use, the pre-scribing of section lengths can be in opposed pairs at opposite ends of each section length.

Thus a 'male' pre-profiled section at one end is matched by a 'female' pre-profiled section at the other end. The pre-profile or 'scribe' is of the section front face.

These 'scribes' may be separated as required from the section length in required fitting lengths.

The strips may be used for limited loading bearing (typically up to 30 lbs or just under 14 kg) for such purposes as hanging pictures (with picture rail strips) or supporting decorative plates (with plate rack strips).

We claim:

1. A wooden architectural moulding strip mounting and jointing system comprising:
   a plurality of spaced individual unitary fasteners (10);
   a continuous length of rigid wooden architectural moulding (18) having a continuous mounting groove (30) of re-entrant profile, in the rear face of said moulding, and having inwardly facing internal ledges (24) in said mounting groove and a decorative outer profile on an opposite front face of the moulding, each of said fasteners comprising:
   a base portion (11);
   a plurality of opposed resiliently deformable limbs (12) upstanding from said base portion;
   profiled noses (14) on the outer ends of said limbs, and spaced to engage said mounting groove in the rear face of a wooden moulding length;
   beveled contact surfaces (16) on said noses forming a progressive ramp surface for engagement with said internal ledges (24);
   external ledges (17) on said noses adjacent said beveled contact surfaces for engaging said internal ledges of said mounting groove,
   the interaction of said external ledges on the fastener limbs and the moulding mounting groove forming a releasable latch assembly securing the fasteners and moulding together in intimate contact,
   the latch assembly being operated by transverse translational movement of the fastener and moulding, together or apart; and
   rectangular corner blocks, with whose side faces the ends of said strip elements of pre-profiled sections, severed at right angles to the section length, can simply be butted.

2. A fastener, as claimed in claim 1, fabricated of synthetic plastics material, such as ABS, for example by moulding.

3. A fastener, as claimed in claim 1, wherein the element has a re-entrant element capture zone profiled to receive and locate a fastener, or a succession of fasteners.

4. A fastener, as claimed in claim 3, wherein the element capture zone comprises a continuous recess of re-entrant profile, for example, a U-shaped cross-section, with tucked-in or re-entrant under-limbs at the mouth thereof, and a supplementary entry recess to receive the body of the fastener base, the arrangement simply requiring an orthogonal translation movement of the element, that is transversely to its own length and across its section depth.

5. A fastener, as claimed in claim 1, wherein the fastener limbs have tapered noses, with underlying opposed ledges, for respectively entering the re-entrant element capture zone and resisting withdrawal by restraining abutment with the boundary mouth of the zone.

6. A fastener, as claimed in claim 1, wherein a plurality of fastener limbs are located, aligned in a row or rows of opposed pairs, running along the intended section length.

7. A fastener, as claimed in claim 1, wherein the fastener base incorporates an aperture to receive another conventional fastener, such as a nail or screw, for securing the fastener body to a mounting surface.

8. A strip element to be fastened by a fastener as claimed in claim 1, comprising a timber moulding with one or more grooves in the rear face thereof extending along a part or the whole of the section length and profiled to receive the fastener limbs, and to deflect and locate the same for secure mounting interengagement therewith.

* * * * *

UNITED STATES PATENT AND TRADEMARK OFFICE
CERTIFICATE OF CORRECTION

PATENT NO. : 5,042,220

DATED : August 27, 1991

INVENTOR(S) : JACKSON, Peter

It is certified that error appears in the above-identified patent and that said Letters Patent is hereby corrected as shown below:

Column 4, line 64    Change "scrap" to --cross--;

Column 4, line 65    Change "cross" to --strip--;

Column 8, line 34    After "of", insert --said--.

Signed and Sealed this

Second Day of March, 1993

Attest:

STEPHEN G. KUNIN

*Attesting Officer*    *Acting Commissioner of Patents and Trademarks*

REEXAMINATION CERTIFICATE (2554th)
United States Patent [19]
Jackson

[11] B1 5,042,220
[45] Certificate Issued May 2, 1995

[54] FASTENER AND STRIP MOUNTING SYSTEM

[75] Inventor: Peter Jackson, Oswestry, United Kingdom

[73] Assignee: Richard Burbidge Limited, Oswestry, England

Reexamination Request:
No. 90/003,464, Jun. 13, 1994

Reexamination Certificate for:
Patent No.: 5,042,220
Issued: Aug. 27, 1991
Appl. No.: 355,745
Filed: May 22, 1989

Certificate of Correction issued Mar. 2, 1993.

[51] Int. Cl.$^6$ .......................... E04C 2/38; F16B 19/00
[52] U.S. Cl. ................................. 52/717.1; 52/714; 411/508; 411/913
[58] Field of Search ............... 52/714, 718.01, 718.03, 52/718.06; 40/155; 411/84, 85, 508, 509, 913

[56] References Cited

U.S. PATENT DOCUMENTS

| | | |
|---|---|---|
| 1,219,616 | 3/1917 | Zytkiewicz . |
| 1,936,113 | 11/1933 | Jelliffe ................. 411/182 |
| 2,090,588 | 8/1937 | Wistell . |
| 3,228,160 | 1/1966 | O'Brien ................... 52/290 |
| 3,298,147 | 1/1967 | Haberman ............... 52/714 |
| 3,701,373 | 10/1972 | Wronke et al. ......... 411/182 |
| 3,703,747 | 11/1972 | Hamman ............... 52/717.1 |
| 3,841,044 | 10/1974 | Brown et al. ............ 24/297 |
| 4,428,135 | 1/1984 | Sobel ........................ 40/155 |
| 4,452,021 | 6/1984 | Anderson ............... 52/717.1 |
| 4,579,492 | 4/1986 | Kazino et al. .......... 411/182 |
| 4,697,774 | 10/1987 | Sarton et al. ............ 24/297 |
| 4,742,662 | 5/1988 | Smith ..................... 52/717.1 |

FOREIGN PATENT DOCUMENTS

| | | |
|---|---|---|
| 1400868 | 11/1968 | Germany . |
| 1936514 | 2/1971 | Germany . |
| 2012338 | 10/1971 | Germany . |
| 707819 | 4/1954 | United Kingdom . |
| 1219616 | 1/1971 | United Kingdom . |
| 1494412 | 12/1977 | United Kingdom . |
| 2124267 | 2/1984 | United Kingdom . |

OTHER PUBLICATIONS

Bouwwereld vol. 68, No. 47, Nov. 24, 1972, pp. 17–22.
DE 1,936,514 (English translation) Germany.
DE 1,400,868 (English translation) Germany.
Bouwwereld vol. 68, No. 47, Nov. 24, 1972, English translation of p. 19.

*Primary Examiner*—Neill Wilson

[57] ABSTRACT

A wooden architectural moulding includes fasteners spaced from each other and each include a continuous mounting groove of re-entrant profile having inwardly facing internal ledges, and a unitary fastener provided with deformable limbs having profiled noses which are arranged to interact with the ledges to connect or disconnect the base member.

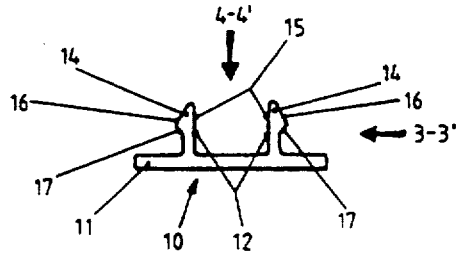

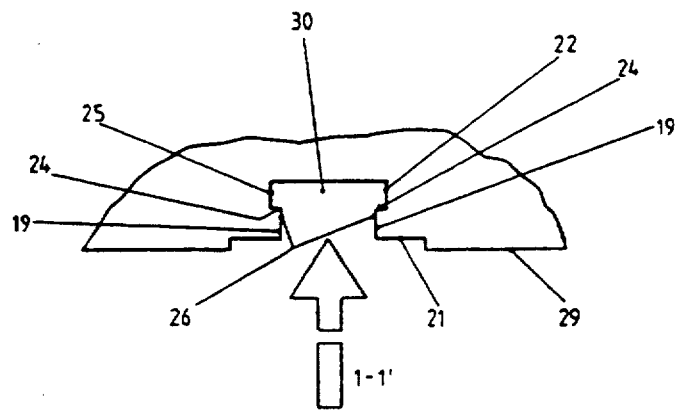

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 3, 5 and 8 are cancelled.

Claims 1, 2, 4, 6 and 7 are determined to be patentable as amended.

1. A wooden architectural [moulding] *molding* strip mounting and jointing system comprising:
   a plurality of spaced individual unitary fasteners (10);
   a continuous length of rigid wooden architectural *molding* [moulding] (18) having a continuous mounting groove (30) of re-entrant profile, in the rear face of said *molding* [moulding], and having inwardly facing internal ledges (24) in said mounting groove and a decorative outer profile on an opposite front face of the *molding* [moulding], each of said fasteners comprising:
   a base portion (11);
   a plurality of opposed resiliently deformable limbs (12) upstanding from said base portion; *said limbs movable towards each other;*
   profiled *outwardly facing and tapering* noses (14) on the [outer] ends of said limbs, and spaced to engage said mounting groove in the rear face of a wooden [moulding] *molding* length;
   beveled contact surfaces (16) on said noses forming a progressive ramp surface [for engagement with said internal ledges(24);] *for entry of said noses into said groove whereby*
   *an* external [ledges] *ledge* (17) [on said ] *at the underside of each* [noses] *nose* adjacent said beveled contact [surfaces] *surface* [for engaging] *can engage* said internal [ledges] *ledge* of said mounting groove, *the distance between said internal ledges (24) being sufficient to allow the limbs (12) to be received within said groove (30) in the relaxed condition in which said limbs lie generally parallel to each other;*
   the interaction of said external ledges on the fastener limbs and the [moulding] *molding* mounting groove forming a releasable latch assembly securing the fasteners and [moulding] *molding* together in intimate contact,
   the latch assembly being operated by transverse translational movement of the fastener and [moulding] *molding*, together or apart; and
   rectangular corner blocks, with whose side faces the ends of said strip elements of pre-profiled sections, severed at right angles to the section length, can simply be butted.

2. A [fastener] *system*, as claimed in claim 1, fabricated of synthetic plastics material, such a ABS, for example by moulding.

4. A *system*, [fastener] as claimed in claim [3] *1*, wherein the [element capture zone comprises a continuous recess of re-entrant profile, for example, a U-shaped cross-section, with tucked-in or re-entrant under-limbs at the mouth thereof, and a supplementary entry recess to receive the body of the fastener base, the arrangement simply requiring an orthogonal translational movement of the element, that is transversely to its own length and across its section depth] *continuous length of rigid wooden architectural molding has a continuous supplementary entry recess, said supplementary entry recess leading to said mounting groove of re-entrant profile and being shaped to receive the body of the fastener base.*

6. A [fastener] *system*, as claimed in claim 1, wherein a plurality of fastener limbs are located, aligned in a row or rows of opposed pairs, running along the intended section length.

7. A [fastener] *system*, as claimed in claim 1, wherein the fastener base incorporates an aperture to receive another conventional fastener, such as a nail or screw, for securing the fastener body to a mounting surface.

* * * * *